United States Patent [19]

Bäckström et al.

[11] Patent Number: 5,229,996
[45] Date of Patent: Jul. 20, 1993

[54] SPLIT-WINDOW TIME ALIGNMENT

[75] Inventors: Tomas Bäckström, Kista; Anders Sandell, Upplands Väsby; Peter Wahlström, Vallingby, all of Sweden

[73] Assignee: Telefonaktiebolaget L M Ericsson, Stockholm, Sweden

[21] Appl. No.: 915,755

[22] Filed: Jul. 21, 1992

Related U.S. Application Data

[63] Continuation of Ser. No. 661,603, Feb. 28, 1991, abandoned.

[51] Int. Cl.$^5$ ............................ H04J 3/06; H04L 7/00
[52] U.S. Cl. .................................. 370/100.1; 375/107; 455/33.1; 370/95.3
[58] Field of Search .................. 370/95.3, 100.1, 104.1; 375/107, 108, 114, 116; 455/33

[56] References Cited

U.S. PATENT DOCUMENTS

| | | | |
|---|---|---|---|
| 4,054,453 | 10/1977 | Kaul et al. | 375/107 |
| 4,231,114 | 10/1980 | Dolikian | 455/49 |
| 4,352,955 | 10/1982 | Kai et al. | 455/31 |
| 4,356,484 | 10/1982 | Eckhardt | 340/895.03 |
| 4,414,661 | 11/1983 | Karlstrom | 370/95 |
| 4,601,059 | 7/1986 | Gammenthaler | 455/54 |
| 4,627,098 | 12/1986 | Dolikian et al. | 455/70 |
| 4,637,016 | 1/1987 | Ciancibello et al. | 370/100 |
| 4,688,210 | 8/1987 | Eizenhöfer et al. | 370/100 |
| 4,688,217 | 8/1987 | Ishi et al. | 375/111 X |
| 4,742,514 | 5/1988 | Goode et al. | 370/109 |
| 4,763,322 | 8/1988 | Eizenhöfer | 370/95 |
| 4,785,450 | 11/1988 | Bolgiano et al. | 370/95 |
| 4,815,073 | 3/1989 | Grauel et al. | 370/95 |

FOREIGN PATENT DOCUMENTS 0173348 3/1986 European Pat. Off.
2095516 9/1982 United Kingdom.

OTHER PUBLICATIONS

GSM Recommendation 05.10, Version 3.5.0, "Radio Sub-System Synchronization" (Jan. 1991).
"Cellular System, Dual-Mode Subscriber Equipment-Network Equipment Compatibility Specification", EIA Project No. 2215, (Dec. 1989), pp. 2-56-2-58.

Primary Examiner—Curtis Kuntz
Assistant Examiner—T. Ghebretinsae
Attorney, Agent, or Firm—Burns, Doane, Swecker & Mathis

[57] ABSTRACT

Synchronization is maintained between a regional radio transmitter/receiver and a remote transmitter/receiver communicating across a TDMA channel by detecting time misalignment of communications from the remote transmitter/receiver to the regional transmitter/receiver, commanding the remote transmitter/receiver to adjust its transmission timing, and, until the remote transmitter/receiver has adjusted its transmission timing, looking for a synchronization pattern accompanying transmissions by the remoter transmitter/receiver during two discontinuous time intervals, one centered about a time of occurrence of the synchronization pattern before the command and another centered about an expected time of occurrence of the synchronization pattern in response to the command. Effectively, what would otherwise be a disadvantageously wide time window is split into two advantageously narrow time windows to avoid detection of false syncs. Fewer false syncs are detected, and speech quality is increased.

6 Claims, 5 Drawing Sheets

SLOT FORMAT, MOBILE STATION TO LAND STATION

PHYSICAL LAYER CONTROL MSG. (FACCH)

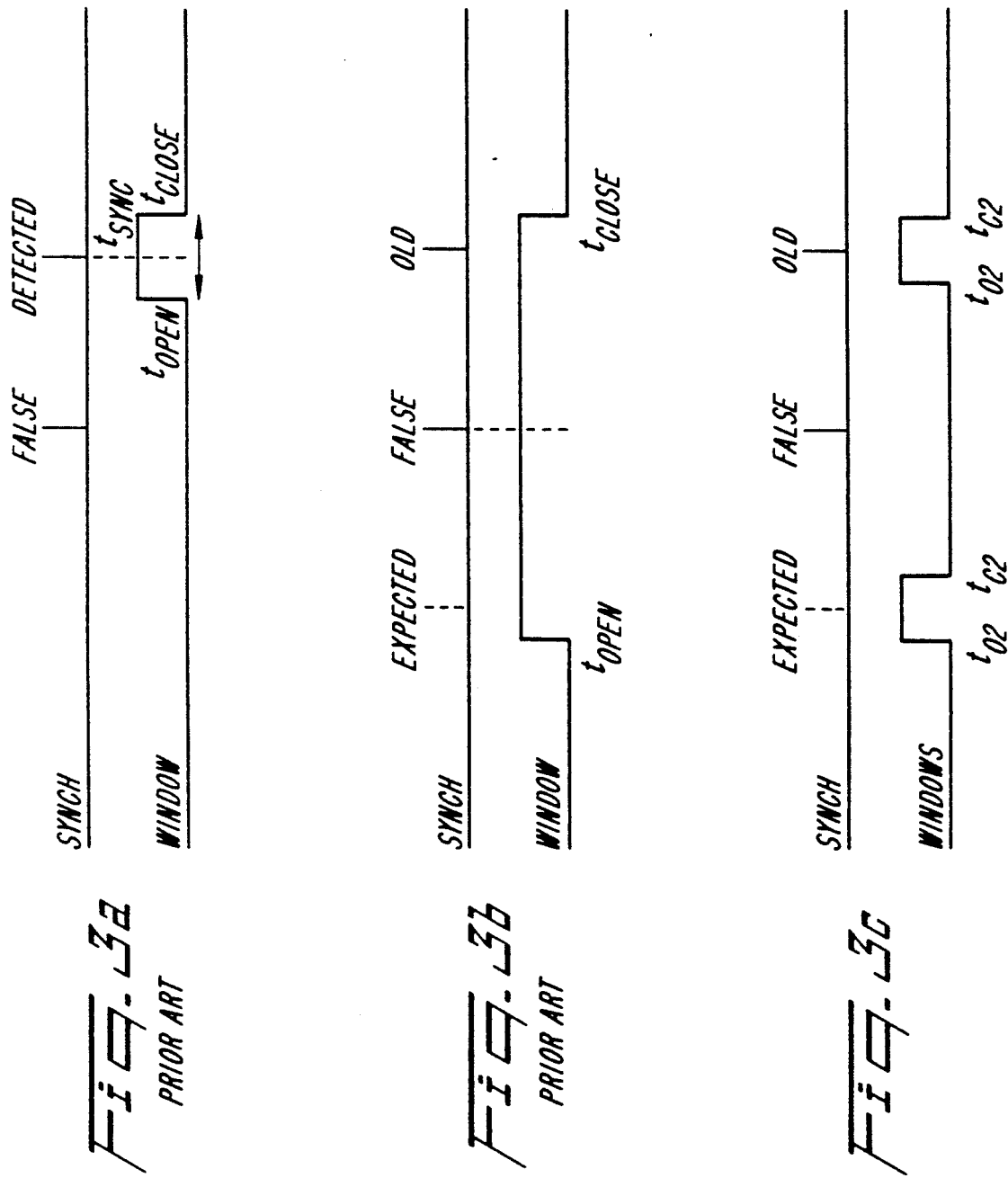

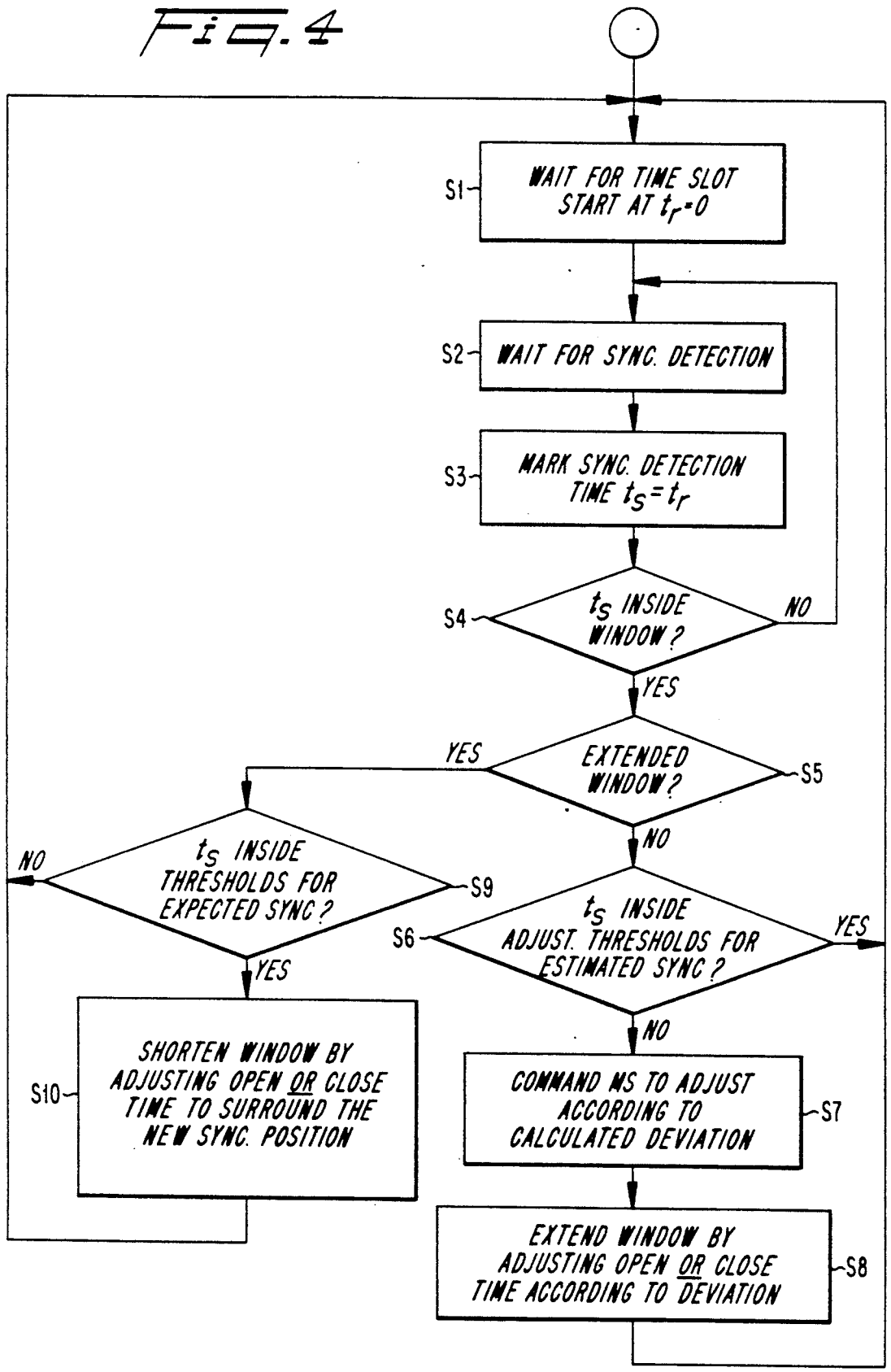

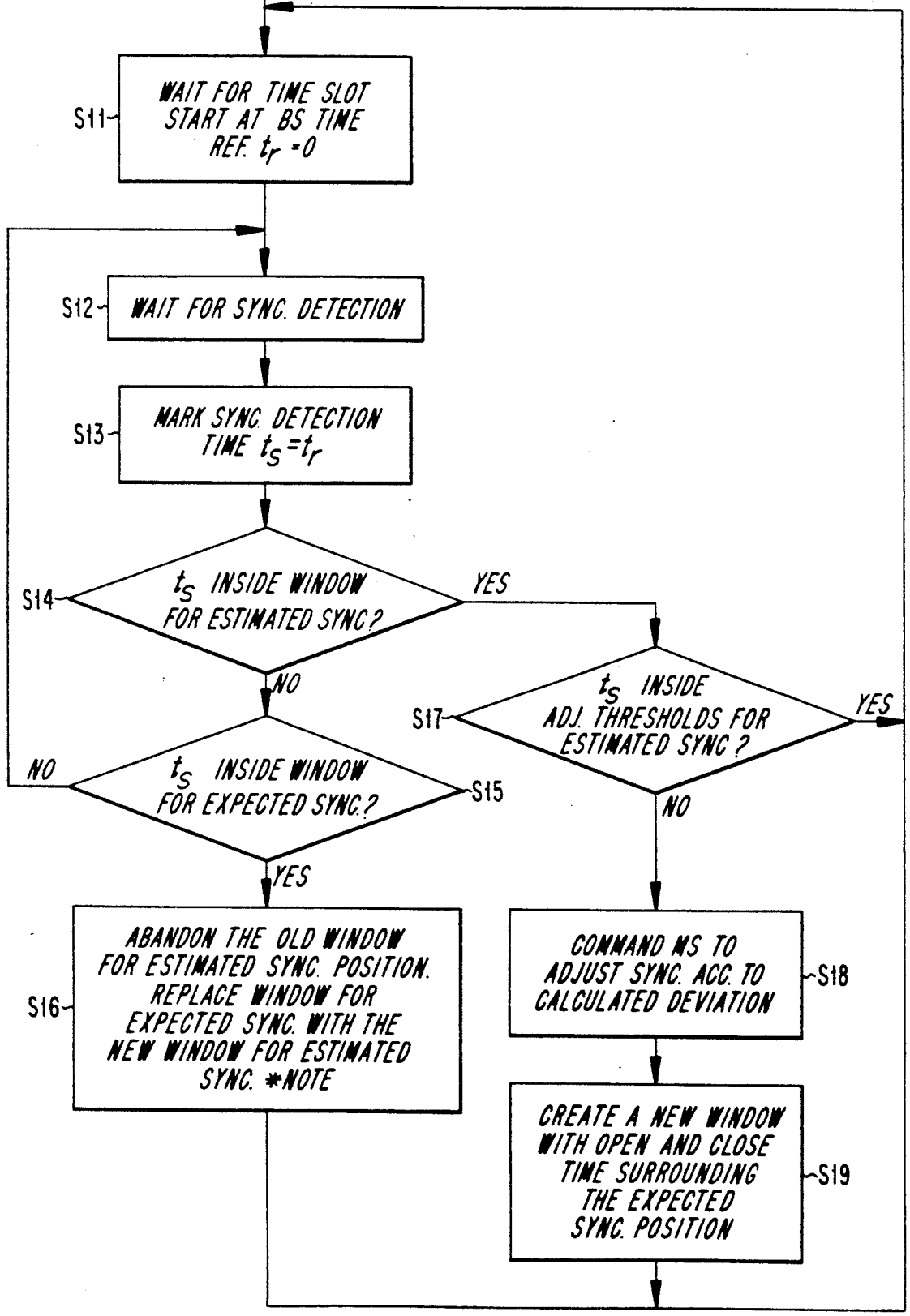

SPLIT-WINDOW TIME ALIGNMENT

This application is a continuation of of application Ser. No. 07/661,603, filed Feb. 28, 1991, now abandoned.

BACKGROUND OF THE INVENTION

The present invention relates to communications synchronization and particularly to time-alignment of transmissions of a mobile station in relation to the time reference of abase station in a mobile radiotelephone system.

Presently, much attention and developmental effort is being focused on digital mobile radiotelephone systems. Typically, the mobile stations and the respective base stations of such a system communicate across TDMA channels whereby multiple mobile stations share the same transmission and reception frequencies but are assigned separate time slots within those frequencies. Each mobile station must accurately confine its transmissions to the bounds of the time slot assigned. Otherwise, transmissions from different mobile stations "collide", resulting in mutual interference in reception at the base station.

Accurate time-alignment becomes especially important as the cell size of a cellular system increases, since the maximum time dispersion at the base station of transmissions from the mobile stations likewise increases. Time dispersion refers to the different propagation delays of different transmitting mobile stations located at different distances from the base station. As the mobile stations move, the effect at the base station of different varying propagation delays is compensated for at the mobile stations by the base station commanding the mobile stations to adjust their transmission timing. Time slots therefore occur at the base stations in regular order without any apparent effect from the different propagation delays.

Techniques have been developed to keep the transmissions of the respective mobile stations in proper time-alignment. Typically, while communications are being established between a mobile station and a base station, the mobile station times its transmissions in relation to transmissions received from the base station according to a "standard off-set reference". In one proposed system, for example, the mobile station times its transmission such that transmission power is dying out at the conclusion of the transmission 42 symbol periods before the next expected communications burst from the base station. Until the base station has assigned the mobile station a specific transmission time, the mobile station transmits a shortened burst of shorter duration than normal to minimize the likelihood of colliding with other transmissions.

Once a time slot has been assigned to the mobile station, time-alignment of transmissions by the mobile station is continually checked by the base station by noting the time of arrival of a synchronization pattern transmitted by the mobile station during each burst. Time drift of transmissions by the mobile station with respect to the clock of the base station occurs due to time dispersion. When that drift exceeds a predetermined threshold, the base station sends a time-alignment command to the mobile station instructing it to advance or retard its transmissions by a specified amount of time.

The synchronization pattern transmitted by the mobile station at each burst may also occur randomly in normal speech data. Therefore, to avoid spurious detection of apparent synchronization patterns ("false syncs"), the base station ignores synchronization patterns not occurring within a specified time interval, or "window", of where they are expected to occur.

When the base station issues a time-adjustment command to the mobile station, the problem occurs that the base station cannot tell exactly when the mobile station will have responded to the command and have begun transmitting according to the adjusted timing. For a short time, therefore, the sync pattern may occur either at the old timing or the new instructed timing. In order to provide for both possibilities, in the prior art, the time-alignment window wherein synchronization patterns are recognized has been stretched, or widened, to cover both the old timing position and the new timing position. With the widening of the time-alignment window, the probability of detecting false syncs increases, and speech quality decreases proportionally.

SUMMARY OF THE INVENTION

According to the present invention, synchronization is maintained between a regional radio transmitter/receiver and a remote transmitter/receiver communicating across a TDMA channel by detecting time misalignment of communications from the remote transmitter/receiver to the regional transmitter/receiver, commanding the remote transmitter/receiver to adjust its transmission timing, and, until the remote transmitter/receiver has adjusted its transmission timing, looking for a synchronization pattern accompanying transmissions by the remote transmitter/receiver during two discontinuous time intervals, one centered about a time of occurrence of the synchronization pattern before the command and another centered about an expected time of occurrence of the synchronization pattern in response to the command. Effectively, the disadvantageously wide time window of the prior art is split into two advantageously narrow time windows to avoid detection of false syncs. Fewer false syncs are detected, and speech quality is increased.

BRIEF DESCRIPTION OF THE DRAWINGS

FIG. 2, including

FIG. 3, including FIGS. 3a and 3b, is a timing diagram illustrating the principle of the present invention;

FIG. 4 is a flowchart representation of the time-alignment process according to the prior art; and FIG. 5 is a flowchart representation of the time-alignment process according to the present invention.

DETAILED DESCRIPTION OF THE PREFERRED EMBODIMENT

Figure 1:
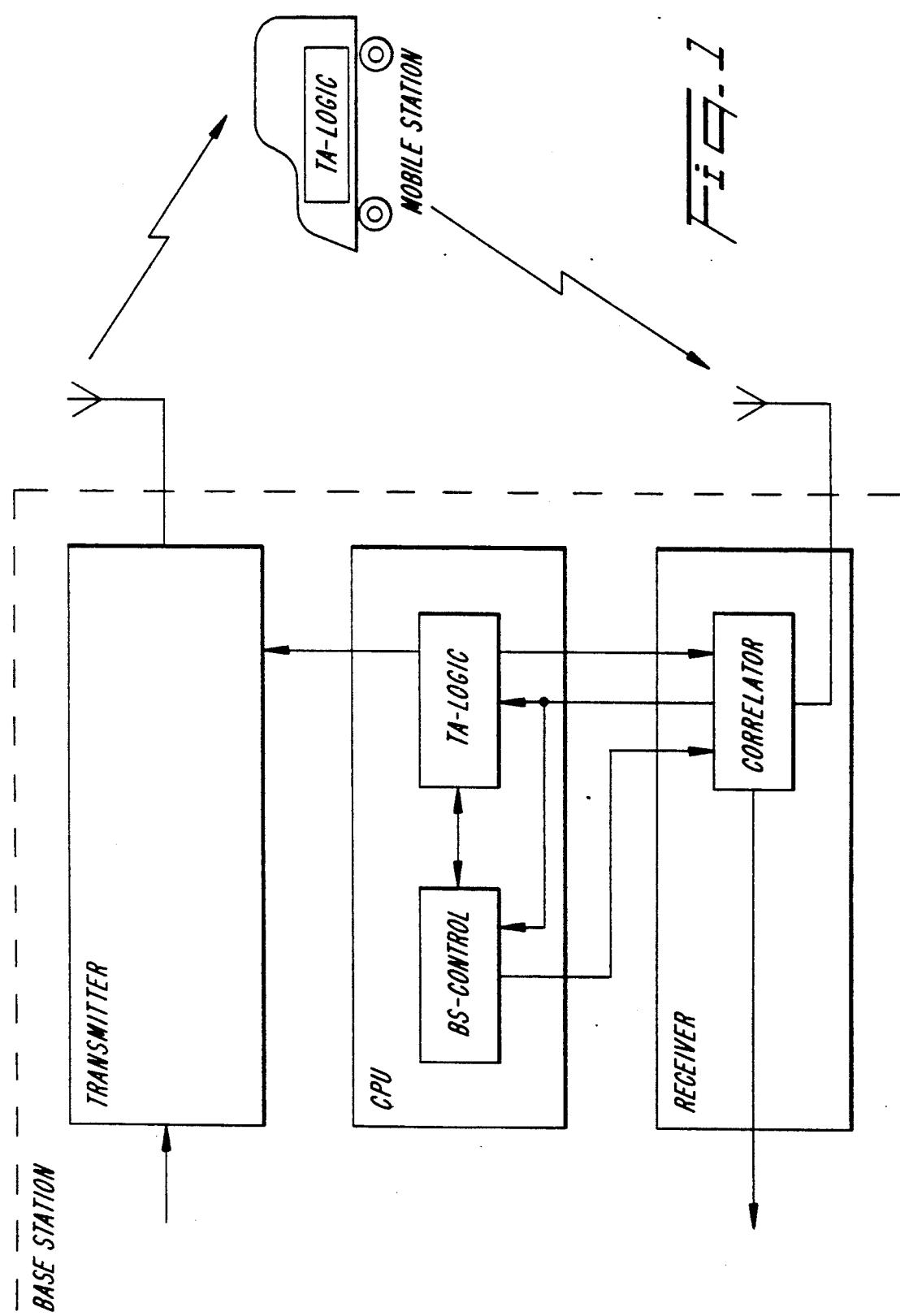
FIG. 1 is a block diagram of a communications synchronization portion of a base station and a mobile station in a mobile radiotelephone system.

Referring to FIG. 1, a communications synchronization portion of a base station and a mobile station in a mobile radiotelephone system will presently be described. For simplicity, elements not essential to an understanding of the present invention have been omitted. The base station includes a transmitter portion, a receiver portion, and a control portion, the latter being implemented by a CPU. The CPU realizes, among other functions, a base station control function (BS-CONTROL) and a time-alignment logic function (TA- LOGIC). The receiver includes, among other elements not essential to an understanding of the present invention, a correlator. The correlator produces an output signal to both BS-CONTROL and TA-LOGIC and receives output signals from each of the same. The correlator maintains a reference time base and times the occurrence of an incoming synchronization signal in relation to the time-alignment window. The results of the measurements are sent to the CPU. The CPU in turn provides new parameters for the time-alignment window.

Considering in greater detail the CPU, the BS-CONTROL portion thereof makes decisions about estimated and expected sync time. In addition, it receives time measurements from the correlator and informs the TA-LOGIC and correlator about the expected sync time. The TA-LOGIC portion of the CPU calculates necessary time-alignment adjustments according to information collected from the correlator and BS-CONTROL. The time adjustments are sent to the transmitter to form a time-alignment message and to the correlator to adjust the time-alignment window. The time-alignment adjustment message generated by TA-LOGIC is inserted in the physical layer control message by the transmitter and transmitted to the mobile station. In the mobile station, a corresponding TA-LOGIC block receives the time-alignment message from the transmitter and adjusts the mobile station time reference accordingly.

Figure 2A:
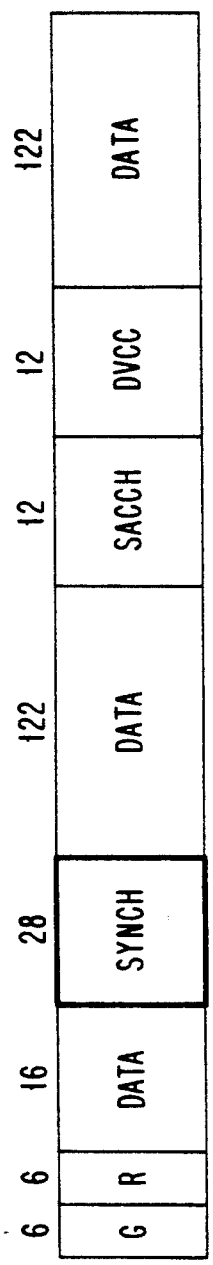
FIGS. 2a and 2b, is a diagram of communications exchanged between the base station and a mobile station.

Referring not to FIG. 2a, the slot format of communications from the mobile station to the base station, or land station, may be seen to include a synchronization field SYNC of 28 bits in a preferred embodiment. Each mobile station communicating on a particular frequency is assigned a different synchronization word. The synchronization words are preferably chosen to have good auto-correlation properties to facilitate synchronization and training of the correlator. Since the remaining fields of the slot format are not of particular concern to the present invention, their description is omitted.

Figure 2B:
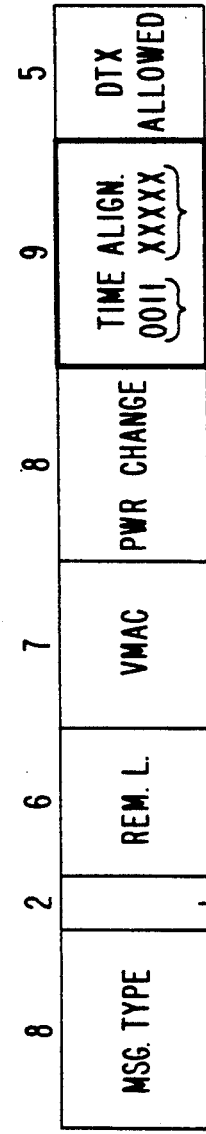

Time-alignment adjustments may be directed by the base station as necessary using a field of a physical layer control message as illustrated in FIG. 2b. The physical layer control message is periodically issued on a "fast-access control channel" (FACCH) and/or a "slow-access" control channel (SAACH) defined between the base station and the mobile station. The time-alignment field of the physical layer control message includes, in one embodiment, 9 bits, the first 4 bits designating time-alignment as the parameter being affected and the remaining 5 bits specifying the amount of time adjustment in terms of half-symbol times. According to a preferred embodiment, the timing of the mobile station may be advanced up to 30 half-symbol times from the standard offset reference or may be retarded, but only back to the standard offset reference. In other words, the mobile station is ordered to transmit some time amount before the standard offset reference. A symbol represents two bits of digital information according to $\pi/4$ DQPSK modulation.

Referring now to FIG. 3, the principle of the present invention will now be described. In the prior art, as illustrated in FIGS. 3a and 3b, synchronization patterns from the mobile station are normally detected during a narrow time window centered about the expected time of occurrence of the synchronization pattern. Time is assumed to be increasing from left to right. When the mobile station is in proper time-alignment, the expected time of occurrence of the synchronization pattern and the actual time of occurrence, $t_{sync}$, will nearly coincide. The window begins, or "opens", at a time $t_{open}$ preceding $t_{sync}$ and ends, or "closes", at a time $t_{close}$ succeeding $t_{sync}$. Accordingly, an actual synchronization pattern occurring within the time-alignment window is properly detected whereas a false synchronization pattern naturally occurring within voice data at a time before the close of the time-alignment window is ignored.

When the base station instructs the mobile station to adjust its timing, the base station widens the time-alignment window to open before the earlier of the old synchronization patternaand the expected synchronization pattern and to close after the later of the old synchronization pattern and the expected synchronization pattern. Intervening false synchronization patterns are therefore detected, resulting in synchronization errors and degradation of speech quality. The probability of false sync detection becomes especially high when the maximum time adjustment is commanded.

According to the present invention, as illustrated in FIG. 3c, two independent synchronization windows are defined, one opening at time $t_{o1}$ and closing at time $t_{c1}$ and centered about the time of the old synchronization pattern, and another opening at time $t_{o2}$ and closing at time $t_{c2}$ and centered about the time of the expected occurrence of the new synchronization pattern. Preferably, the time-alignment windows are made as narrow as possible in accordance with the maximum time dispersion of the radiotelephone system. In a preferred embodiment, the window is caused to extend for 40 $\mu$sec on either side of the nominal sync time, for an overall width of the time-alignment window of 80 $\mu$sec. The total time for sync pattern detection therefore remains constant independent of the amount of adjustment with the result that the risk of false sync pattern detection remains constant. The intervening false synchronization pattern therefore remains undetected, reducing synchronization errors and enhancing speech quality.

The operation of the prior art system and that of the present invention may be contrasted with reference to FIGS. 4 and 5. Referring first to FIG. 4, a synchronization detection routine in the prior art was executed by waiting for the start of a time slot at a reference time $t_{r=0}$ in step S1 and subsequently waiting for a synchronization detection signal in step S2. When the synchronization detection signal is received at a time $t_s$, the corresponding reference time $t_r$ is recorded in step S3. In step S4, it is decided whether the synchronization detection time $t_s$ is inside the time-alignment window. If not, the synchronization signal is determined to be a false sync, and the routine returns to step S2 to wait for a subsequent synchronization detection signal.

If the synchronization detection time $t_s$ is determined to be inside the time-alignment window, it is then determined in step S5 whether or not the present time-alignment window has been extended in response to a time-alignment command. If the window is not an extended one, it is ascertained in step S6 whether the synchronization detection time $t_s$ is inside predetermined adjustment thresholds for the estimated synchronization position, i.e., without any adjustment having been commanded. If the synchronization detection time is within the appropriate thresholds, the mobile station is in proper time-alignment and the routine returns to wait for the commencement of the next time slot. If the synchronization detection time is not within the appropriate thresholds, then the mobile station is commanded to adjust its timing according to the calculated deviation in step S7. Following the adjustment command, the time-alignment window is extended in step S8 by adjusting the opening or closing time of the window according to the deviation amount. The routine then returns to wait for the commencement of the next time slot.

During the subsequent iteration of the routine, the window will be judged to be extended in step S5, and it will therefore be determined in step S9 whether or not the synchronization detection time $t_s$ is within thresholds established for the expected synchronization position, i.e., in response to a time alignment adjustment command. If not, the window remains extended and the routine returns to wait for the commencement of the next time slot. If the synchronization detection time is within the established thresholds, the time-alignment window is shortened by adjusting the opening or closing time so as to surround the new synchronization position.

The preceding operation is to be contrasted with that of the present invention, illustrated in FIG. 5. Referring to FIG. 5, it may be observed that the first three steps S11, S12, and S13 are identical to corresponding steps S1, S2, and S3 of the prior art routine previously described. In steps S14 and S15, however, it is determined whether the synchronization detection time $t_s$ is inside either of two separate windows, one for the estimated synchronization position (without adjustment) and one for the expected synchronization position (with adjustment). As the terms "estimated" and "expected" imply, the synchronization position previous to issuance of an adjustment command is known with somewhat less certainty due to drift of the mobile station's time reference than the synchronization position following an adjustment command. Although the exact time at which the mobile station will have responded to the adjustment command is uncertain, once the mobile station has responded, the resulting synchronization position is fairly well ascertained. If the synchronization detection time is not inside either window, a false sync is indicated, and the routine returns to step S12 to wait for the next synchronization detection signal.

If it is determined in step S14 that the synchronization detection time is inside the window for the estimated synchronization time, then it is determined in step S17 whether the synchronization detection time satisfies the established thresholds for the estimated synchronization time. If so, the routine returns. If not, a synchronization adjustment command is issued in step S18 as in the previously described routine. In step S19, however, instead of the old time alignment window simply being extended, a new window is created with opening and closing times that surround the expected synchronization position.

When it is determined in step S15 that the synchronization detection time $t_s$ is inside the window for the expected synchronization position, i.e., following a time-alignment adjustment command, the old window for the estimated synchronization time is abandoned and the window for the expected synchronization position is replaced with a new window for the estimated synchronization position. When no adjustment is being performed, the windows for the estimated and expected synchronization positions may be identical.

By splitting the time-alignment window into two small windows during the time-alignment adjusting procedure, the risk of detecting false sync patterns is reduced. As a result, fewer synchronization errors occur, and the average speech quality is improved.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of maintaining synchronization between a regional radio transmitter/receiver and a remote transmitter/receiver communicating across a TDMA channel, comprising the steps of:

detecting time misalignment of communications from said remote transmitter/receiver to said regional transmitter/receiver;

commanding said remote transmitter/receiver to adjust its transmission timing; and until said remote transmitter/receiver has adjusted its transmission timing, looking for a synchronization pattern accompanying transmissions by said remote transmitter/receiver during two discontinuous time intervals, one centered about a time of occurrence of said synchronization pattern before said commanding step and another centered about an expected time of occurrence of said synchronization pattern in response to said commanding step.

2. An apparatus for maintaining synchronization between a regional radio transmitter/receiver and a remote transmitter/receiver communicating across a TDMA channel, comprising:

means for detecting time misalignment of communications from said remote transmitter/receiver to said regional transmitter/receiver;

means for commanding said remote transmitter/receiver to adjust its transmission timing; and means for looking for a synchronization pattern accompanying transmissions by said remote transmitter/receiver during two discontinuous time intervals until said remote transmitter/receiver has adjusted its transmission timing, one of said discontinuous time intervals being centered about a time of occurrence of said synchronization pattern before said remote transmitter/receiver has been commanded to adjust its transmission timing and another of said discontinuous time intervals being centered about an expected time of occurrence of said synchronization pattern after said remote transmitter/receiver has been commanded to adjust its transmission timing.

3. A method of reducing the acceptance of false synchronizing patterns at a base station comprising the steps of:

commanding a mobile station to adjust its transmission timing;

detecting a synchronization pattern accompanying a signal from said mobile station; and accepting said synchronization pattern only if said synchronization pattern begins during either of two discontinuous time periods.

4. The method of claim 3, wherein said two discontinuous time periods comprise:

a first time period centered about an expected beginning time of said synchronization pattern before said commanding step; and a second time period centered about an expected beginning time of said synchronization pattern in response to said commanding step.

5. An apparatus for reducing the acceptance of false synchronizing patterns at a base station comprising:

means for commanding a mobile station to adjust its transmission timing;

means for detecting a synchronization pattern accompanying a signal from said mobile station; and means for accepting said synchronization pattern only if said synchronization pattern begins during either of two discontinuous time periods.

6. The apparatus of claim 5, wherein said two discontinuous time periods comprise:

a first time period centered about an expected beginning time of said synchronization pattern before said means commands said mobile station; and a second time period centered about an expected beginning time of said synchronization pattern in response to said means commanding said mobile station.

* * * * *